Patented Apr. 14, 1931

1,800,986

UNITED STATES PATENT OFFICE

LEWIS B. ESMOND, OF BOSTON, MASSACHUSETTS, AND WERNER W. DUECKER, OF PITTSBURGH, PENNSYLVANIA

METHOD OF PREPARING EDIBLE EMULSIONS OF SOLID IN FAT AND PRODUCT THEREOF

No Drawing.   Application filed March 6, 1929.   Serial No. 344,912.

Our invention relates to the preparation of edible emulsions of solids in fats such as are employed in confectionery, cake icing, and the like, and consists in a modification in the composition and in the method of preparation, in consequence of which the emulsion is stabilized and its quality is improved. We shall first describe our invention in specific application to the preparation of chocolate, and then indicate its wider applicability.

When chocolate or articles containing chocolate, such as chocolate-covered candy, are kept for some time under ordinary store conditions, or when such articles are kept under fluctuating conditions of temperature, the consistency changes; they tend to become granular; and soon lose their initial glossy, shiny appearance and become dull and aged. Sometimes they seem to be covered with a thin white film or bloom. The bloom on chocolate is generally regarded as of two types. It is common, in the preparation of such articles, to incorporate with the chocolate a quantity of wax or fat, ordinarily cocoa butter, in order to prevent or to delay the progress of undesired granulation; and it is thought that fluctuations of temperature cause some of the fat to crystallize and to appear on the surface as a thin white film. The second type of blooming is thought to be produced upon such articles as contain sugar, as all articles of confectionery do, and is thought to be produced after the articles have been exposed in an atmosphere of rather high humidity. The moisture in the air dissolves superficially the sugar in the chocolate; and, on subsequent evaporation, the sugar remains, crystallized upon the surface. The blooming of chocolate confectionery has hitherto been beyond control, and continues to be a cause of heavy losses to candy manufacturers.

In the preparation of chocolate, cocoa beans cracked into nibs and roasted are crushed in a mill. The whole becomes, under treatment and at the somewhat elevated temperature of operation, a fluid mass, known as "chocolate liquor." To this mass, for the preparation of such products as we have named, cocoa butter is added and, ordinarily, sugar also.

In the practice of our invention, gelatine is dissolved in water, the solution is added to chocolate liquor, and the mass is heated and agitated, until substantially all the water has been removed, and the gelatine left finely dispersed (or possibly combined) in the chocolate liquor.

The composition of a typical chocolate coating may include cocoa butter, 120 pounds; chocolate liquor, 500 pounds; sugar, 450 pounds. In producing a coating of this composition, in the practice of our invention, the following procedure may be pursued. Part of the whole quantity of chocolate liquor, say 50 pounds, is placed in a steam kettle, agitated, and heated to 160° F. A quantity of gelatine, which may range from 0.5% to 5% of the total quantity of chocolate coating, and which may be fixed at, say, 7½ pounds of 4E gelatine, is dissolved in 2½ gallons of water, and this solution is introduced in a small stream to the heated chocolate liquor in the kettle while agitation continues. Upon the addition to it of the gelatine solution the mass of chocolate liquor begins to stiffen, but under continued heat the water is driven off, and eventually the mass becomes fluid again. The heating of the gelatine-liquor mixture is continued and the temperature is gradually increased, until 220° F. is attained, and at that temperature substantially all of the water will have been driven off, and the mixture will consist of gelatine dispersed in chocolate liquor. This mass is then introduced, with the remainder of the chocolate liquor, and with the other ingredients named above of the coating, into milling apparatus and there at a temperature of 140° F. brought to smooth and homogeneous condition. The mass may then be finished in usual manner.

The composition of the mix may vary. Proportions may be changed; sugar, for instance, may be omitted; flavor-modifying ingredients may be added, etc. This method of dispersing gelatine in chocolate liquor may be employed in the preparation of chocolate coatings and the like by other particular modes of procedure. In any mode of procedure gelatine-containing chocolate liquor, prepared in the manner described above, may be used in place of chocolate liquor which lacks a gelatine component.

Edible gelatine varies widely in grade or quality. We preferably employ gelatine made from calf stock, as neutral as possible in the matter of acidity, and of relatively high gel strength and viscosity. The higher the gel strength the less the quantity of gelatine required. We find it desirable to employ the gelatine when comminuted to such degree of fineness as to pass through a 60-mesh sieve.

The product of our improved process, when compared with the product of the usual process not involving the use of gelatine, possesses these characteristics: Plasticity is increased, and in consequence the covering power, when the material is used as a coating, is increased (actually by as much as 5 to 10%). Crystallization is diminished. The product of our improved process is superior in smoothness of body, and because of such smoothness of body the milling time may be reduced to an extent as great as one half while the quality of the product is maintained. The surface of the confection or coating is of smoother and more glossy appearance. Both sugar blooming and fat blooming are retarded. And the retardation of fat blooming is particularly noticeable if the sugar content be high.

Debased preparations are known, formed by separating the cocoa and the cocoa butter which together constitute chocolate in the proper sense of the term, and by then combining with the cocoa another fat of inferior grade, quality, and flavor. Such debased preparations resemble true chocolate in appearance and approximate true chocolate in flavor, and in popular usage are not distinguished, but are called chocolate also. These debased preparations are susceptible to the practice of our invention, and by like procedure. A portion of the debased chocolate liquor is rendered liquid by heat, and to it such a solution of gelatine as has been indicated is added, and after the driving off of the water and the incorporation of the gelatine in the manner described, the mass is combined with the other ingredients of the intended product, in milling apparatus, and the operation completed in the manner described.

Chocolate may be regarded as a fat carrying in the form of an emulsion a coloring and flavoring substance, which substance is cocoa. Our invention is applicable to stabilize and to improve the quality of emulsions generally of finely divided solid in fat. For example, a coating material for confectionery may consist of an emulsion of sugar in a fat. The viscosity of this material may be increased, its covering power may be increased, and its tendency to become hard with age may be diminished by incorporating in it gelatine, after the manner described.

We claim as our invention:

1. That step in the preparation of edible emulsions of finely divided solid material in fat herein described which consists in introducing into an emulsion of such solid material in fat an aqueous solution of gelatine, agitating the mixture and driving off water under elevated temperature, and grinding the substantially water-free gelatine-containing emulsion so produced with an additional quantity of fat.

2. That step in the preparation of chocolate herein described which consists in introducing into a heated and agitated body of chocolate liquor an aqueous solution of gelatine, continuing agitation at elevated temperature with elimination of the water, and grinding the gelatine-containing and water-free chocolate liquor so produced with other ingredients of commercial chocolate.

3. That step in the preparation of chocolate herein described which consists in introducing into a heated and agitated body of chocolate liquor an aqueous solution of gelatine, continuing agitation at elevated temperature with substantial elimination of the water, and grinding the gelatine-containing and water-free chocolate liquor so produced with cocoa butter and an additional quantity of chocolate liquor.

In testimony whereof we have hereunto set our hands.

LEWIS B. ESMOND.
WERNER W. DUECKER.